United States Patent [19]

Tojo et al.

[11] Patent Number: 4,779,137
[45] Date of Patent: Oct. 18, 1988

[54] IMAGE PICKUP APPARATUS

[75] Inventors: Akihiko Tojo; Seiji Hashimoto, both of Yokohama, Japan

[73] Assignee: Canon Kabushiki Kaisha, Tokyo, Japan

[21] Appl. No.: 39,288

[22] Filed: Apr. 17, 1987

[30] Foreign Application Priority Data

Apr. 23, 1986 [JP] Japan .................................. 61-093982
Jul. 25, 1986 [JP] Japan .................................. 61-174981

[51] Int. Cl.⁴ .............................................. H04N 3/11
[52] U.S. Cl. ............................ 358/213.11; 358/213.19
[58] Field of Search ................... 358/213.11, 213.13, 358/213.26, 213.27, 213.28, 213.29, 213.31, 212, 906, 909, 213.12; 250/578

[56] References Cited

U.S. PATENT DOCUMENTS

4,573,077 2/1986 Imai ..................................... 358/212
4,603,354 7/1986 Hashimoto et al. ............ 358/213.13

Primary Examiner—L. T. Hix
Assistant Examiner—David M. Gray
Attorney, Agent, or Firm—Fitzpatrick, Cella, Harper & Scinto

[57] ABSTRACT

An image pickup system includes an image pickup device consisting of a plurality of photoelectric transducer cells subjected to nondestructive read access, a driver circuit for nondestructively reading out a photoelectrically converted information signal from the image pickup device a plurality of times, and a gain controller for changing a gain of the information signal in accordance with a number of read cycles.

11 Claims, 9 Drawing Sheets

IMAGE PICKUP APPARATUS

BACKGROUND OF THE INVENTION

1. Field of the Invention

The present invention relates to an image pickup apparatus using an image pickup means subjected to nondestructive read access. More particularly, the present invention relates to an image pickup apparatus capable of appropriately processing an output from an image pickup means having a wide dynamic range.

2. Related Background Art

In recent years, extensive studies have been made on photoelectric transducers, and especially CCD and MOS solid-state image pickup devices.

According to the principle of operation in a conventional CCD image pickup device, a potential well is formed under a MOS capacitor electrode, charges are generated in the well upon light radiation, and the potential wells are sequentially moved to transfer the accumulated charges to an output amplifier in response to pulses applied to the capacitor electrode in the read mode. Therefore, the CCD image pickup device has a relatively simple structure and low noise generated by the CCD itself. In addition, an amage of a low light intensity can be easily read.

According to the principle of operation in a conventional MOS image pickup device, charges are respectively accumulated in p-n junction photodiodes constituting a light-receiving unit upon light radiation, and the charges accumulated in the photodiodes are transferred to an output amplifier by sequentially turning on MOS switching transistors connected to the photodiodes. Although the MOS image pickup device is more complex than the CCD image pickup device, the accumulation capacity can be large, and hence the dynamic range can be widened.

However, these conventional image pickup devices have the following disadvantages which obstruct future developments of high-resolution image pickup devices.

The conventional CCD image pickup device has disadvantages: (1) since a MOS amplifier as an output amplifier is formed on a single chip, 1/f noise that appears as noticeable noise on an image is generated from an interface between silicon and a silicon oxide film; (2) if the number of cells is increased to obtain a high packing density so as to increase a resolution, a maximum amount of charge accumulated in one potential well is reduced to narrow the dynamic range; and (3) the presence of even one defective cell inhibits charge transfer to decrease the product yield since the CCD device has a structure for transferring the accumulated charge.

The conventional MOS image pickup device has disadvantages: (1) a wiring capacitacce is coupled to each photodiode to generate a large signal voltage drop in the read mode; (2) the wiring capacitance is large to cause generation of random noise; and (3) fixed pattern noise caused by variations in parasitic capacitances of scanning MOS transistors avoids image pickup operation at a low light intensity. In addition, when the cell size is reduced to obtain a higher resolution, the accumulated charge is reduced but the wiring capacitance is not greatly decreased. As a result, the S/N ratio is decreased.

As can be apparent from the above description, the conventional CCD and MOS image pickup devices have high resolution problems. In order to solve these problems, semiconductor image pickup devices employing a new and improved system are proposed (Japanese Patent Disclosure Nos. 150878/1981, 157073/1981, and 165473/1981). According to this system, charge generated upon light radiation is accumulated in a control electrode (e.g., the base of a bipolar transistor, or the gate of an electrostatic induction transistor SIT or MOS transistor). The accumulated charge is amplified and read out by utilizing the amplification function of each cell. In this system, a high output can be read out, the dynamic range can be widened, noise can be reduced, and nondestructive read access can be achieved. Therefore, this system has a possibility for a higher resolution.

A phtoelectric transducer signal is read out a plurality of times in the nondestructive read mode, the amplitude of the readout signal is undesirably decreased because the charge accumulated in the base of the photoelectric transducer element is discharged by a base current in the signal current read mode. The decrease in charge can be approximated by a relationship between a static forward current transfer ratio $h_{FE}$, an equivalent base capacitance $C_B$, and an emitted load capacitance $C_V$ of the photoelectric transducer element:

$$\epsilon \propto C_V/(h_{FE} \times C_B)$$

For example, if $h_{FE}=2000$, $C_B=0.1$ pF, and $C_V=4$ pF, then one read cycle causes a 2% decrease in charge. When the nondestructive read cycle is repeated a plurality of times, the amplitude of the output signal from the image pickup device is decreased according to the number of read cycles. Assume that combinations of horizontal lines of the image pickup device are changed to read out signals from the image pickup device by utilizing the above nondestructive read mode. For example, the readout signal of the first cycle is used as a first field signal, and the readout signal of the second cycle is used as a second field signal to form a still image. When this still image is displayed on a display, differences between signal levels in units of fields cause flickering, thus resulting in poor display.

In addition, assume that a moving object is recorded as a movie image by a conventional image pickup/recording apparatus, and that the movie image is observed as a one-frame still image in the reproduction mode. In this case, since the recording periods between the two adjacent fields are lagged by 1/60 sec., the resultant still image undesirably blurs. In order to form a perfect still image, signals of two fields must be simultaneously obtained by using a means such as a shutter. The signals of two fields must be sequentially read out, and thus a large number of pixels are required. Therefore, when a movie image is to be recorded, flickering and variations in signal level must be minimized.

Each pixel of the image pickup device has an amplification function, and thus a very wide dynamic range can be advantageously obtained.

The above image pickup device can pick up an image in the range of high to low intensities without requiring an illumination lamp.

Although the image pickup means has a wide dynamic range as an advantageous feature, a signal processing system for processing an output from the image pickup means has a narrow dynamic range and cannot appropriately process the signal from the image pickup means, thus resulting in poor reproducibility. In a conventional signal processing system, an output from the image pickup means must be attenuated by an attenuator. In this case, the S/N ratio of the low level signal is undesirably reduced.

SUMMARY OF THE INVENTION

It is an object of the present invention to provide an image pickup apparatus which eliminates the conventional problems described above.

It is another object of the present invention to provide a simple image pickup apparatus capable of forming a high-quality image.

It is still another object of the present invention to provide an image pickup apparatus suitable for picking up a still image.

In order to achieve the above objects according to an aspect of the present invention, there is provided an image pickup apparatus comprising an image pickup device consisting of a predetermined number of photoelectric transducer cells subjected to nondestructive read access, driving means for nondestructively reading out a photoelectrically converted information signal from the image pickup element a plurality of times, and gain control means for changing a gain of the information signal according to the number of read cycles.

With the above arrangement, degradation of the readout signal can be corrected, and flickering can be prevented.

In order to achieve the above objects according to another aspect of the present invention, there is provided an image pickup method comprising the steps of: detecting a level of a predetermined image signal in image pickup means subjected to nondestructive read access; controlling an output gain of the image signal according to the level of the image signal; and reading out a gain-controlled image signal again from the image pickup means and processing a signal on the basis of the output gain.

According to this method, an image signal is generated by the image pickup means subjected to nondestructive read access and is read out to detect its level. In this state, the object luminance is supposed to fall within the dynamic range of the image pickup means.

The gain of the signal processing system is controlled on the basis of the level, and the output from the image pickup means is processed at an optimal operating point.

Thereafter, the image signal is read out again from the image pickup means, and the readout signal is processed by the image processing system.

The output from the image pickup means has the highest S/N ratio and can be processed with less distortion, thereby obtaining an image signal suitable for processing.

The above and other objects, features, and advantages of the present invention will be apparent from the following detailed description in conjunction with the accompanying drawings.

DETAILED DESCRIPTION OF THE PREFERRED EMBODIMENTS

The present invention will be described in detail with reference to the accompanying drawings.

Figure 1:
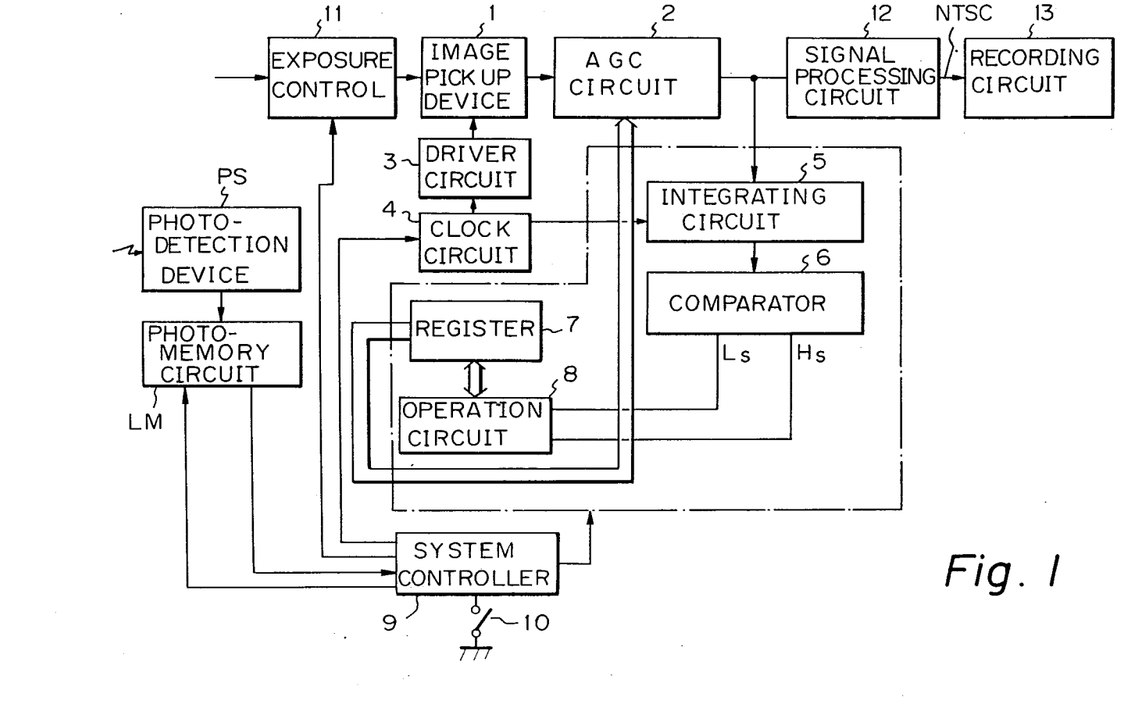
FIG. 1 is a block diagram of an image pickup system according to a first embodiment of the present invention.

FIG. 1 is a block diagram of an image pickup apparatus according to an embodiment of the present invention. The output of an image pickup device 1 in a video camera is connected to one input of an AGC circuit 2 for controlling a gain of an output signal from the image pickup device 1. One input of the image pickup device 1 is connected to the output of clock driver circuit 3 for driving the image pickup device 1. The input of the driver circuit 3 is connected to one output of a clock generator circuit 4 for generating a clock signal in accordance with a standard television format. The other output of the clock generator circuit 4 is connected to one input of an integrating circuit 5 for integrating a luminance signal supplied from the AGC circuit 2. Integration is performed in response to the clock signal from the clock generator circuit 4. The output of the integrating circuit 5 is connected to a comparator 6 for comparing the integrated result with two reference levels. A register 7 is connected to an operation circuit 8 (to be described later) to temporarily store gain data output from the operation circuit 8. The output of the register 7 is connected to the other input of the AGC circuit 2. A photo-detection device PS for a photometric purpose is arranged separately from the image pickup device 1. The output of the photo-detection device PS is connected to a photometry circuit LM for calculating an object luminance on the basis of the outputs from the photo-detection device PS. The operation circuit 8 calculates gain data on the basis of the outputs from the comparator 6. A system controller 9 controls the overall operations of the image pickup system. A trigger switch 10 is connected between the system controller 9 and ground.

The output of an exposure control 11 such as an aperture or shutter is connected to the other input of the image pickup device 1. A signal processing circuit 12 is connected to the AGC circuit 2, the integrating circuit 5, and a recording circuit 13. The signal processing circuit 12 receives a signal from the AGC circuit 2 and processes it to generate an NTSC signal or the like as a standard television signal. The NTSC signal is recorded in the recording circuit 13.

Figure 2:
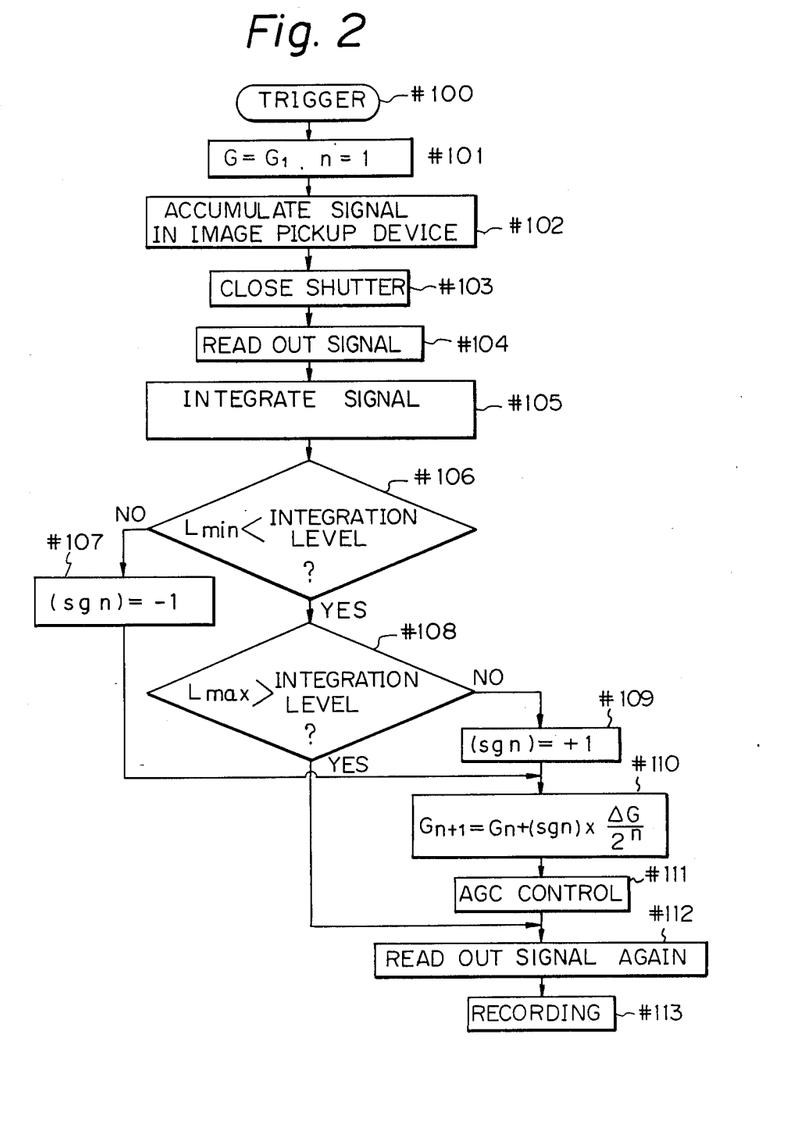
FIG. 2 is a flow chart for explaining the operation of the system shown in FIG. 1.

The operation of the image pickup system having the above arrangement will be described with reference to a flow chart in FIG. 2.

When the trigger switch 10 is turned on in step #100, initial gain data representing G=G1 and n=1 is stored in the register 7 (step #101). The exposure control 11 controls an amount of light incident on the image pickup device 1 on the basis of the exposure control data which is calculated on the basis of the output from the photometry circuit LM and sent from the system controller 9, so that the exposure control 11 accumulates information signals (step #102). Thereafter, the exposure control 11 shields the image pickup device 1 in response to a control signal from the system controller 9 (step #103). The information signal is then read out (#104). A luminance signal in the information signal through the AGC circuit 2 is integrated by the integrating circuit 5 in response to the clock signal from the clock generator circuit 4 (#105). The integrated result is then compared by the comparator 6 with the reference levels. In other words, the comparator 6 determines whether the integration result falls within the predetermined range. More specifically, if the integrated result is less than the lowest threshold level Lmin, the output Ls from the comparator 6 is set at a high (H) level. However, if the integrated result is higher than Lmax, then the Hs output Hs from the comparator 6 is set at a high (H) level.

The operation circuit 8 calculates the next gain value $G_{n+1}$ of the AGC circuit 2 according to the following equation (steps #106 to #110):

$$G_{n+1} = G_n + (sgn) \times \Delta G/2^n$$

where $G_n$ is the currently used gain, $\Delta G$ is a logarithmic value of the gain, (sgn) is a function given such that (sgn)=−1 for a high (H) Ls level and (sgn)=1 for high (H) Hs level, and n is an integer. The gain of the AGC circuit 2 can be optimally controlled according to a two-threshold method (step #111). If both the comparator outputs Hs and Ls are set at low level, i.e., when the output from the image pickup device 1 and hence the integrating circuit 5 falls within the range between Lmin and Lmax, i.e., the optimal range, the output gain is used as a gain $G_l$. It should be noted that the operations in steps #104 to #111 may be repeated In this case, the flow returns from step #111 to step #104 and does not advance to step #112.

The same image information is then read out from the image pickup device 1 subjected to nondestructive read access (step #112). In this case, the exposure control 11 shields the device 1, and thus no changes in image information occur.

The level of the readout image formation is controlled by the AGC circuit and falls within the dynamic range of the signal processing circuit 12. The γ-correction and KNEE correction operations are then performed at optimal operation timings. The processed image is then recorded as a still image in the recording circuit 13.

In the above embodiment, the read time of the output signal from the image pickup device 1 in a photometric operation may be shorter than that in the recording operation.

According to the above embodiment, even if the level of light incident on the image pickup device 1 is excessively high during initial exposure to cause saturation, or even if the level is excessively low not to allow photometric operation, the next exposure amount of the image pickup device 1 can be logarithmically regulated within the optimal range according to the two-threshold method. Therefore, the time required for optimizing the level of the output signal from the image pickup device 1 can be shortened.

According to this embodiment, the total photometric time can be shortened, and thus the amount of incident light can be measured for a short period of time. In addition, a complicated mechanism is not required to fine-adjust the aperture or the like for exposure. Therefore, a compact video camera can be manufactured, and operability can be improved since only a photometric switch or the like is operated According to the above embodiment of the present invention, a signal from an image pickup device having a wide dynamic range can be recorded at an optimal level, as compared to a conventional image pickup system using an ALC circuit. Thus, a user will not lose a shutter chance of a still image. In addition, as compared with a conventional arrangement wherein an output from the image pickup device is always attenuated and the attenuated output is processed, the image pickup device output can be processed at the optimal operation timings, thereby properly reproducing gradation of the video image.

Figure 3:
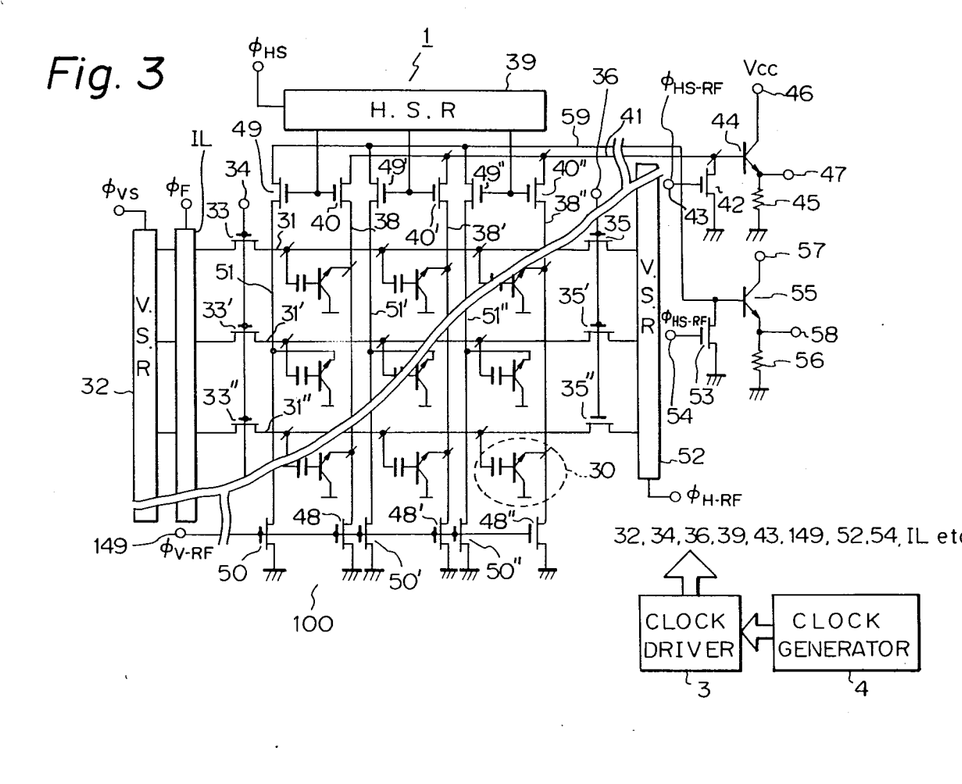
FIG. 3 is a circuit diagram of a photoelectric transducer device which is applied to an image pickup device.

The arrangement of the image pickup device 1 subjected to nondestructive read access is shown in FIG. 3. The structure of the image pickup device 1 may be as shown in, e.g., Japanese Patent Disclosure No. 12764/1985, and a detailed description will be omitted.

As shown on FIG. 3, a reference photosensor cell 30 is indicated by a dotted circle. In this cell, the collector of a bipolar transistor is connected to a semiconductor substrate and a semiconductor substrate electrode. The image pickup device 1 comprises: horizontal lines 31, 31', 31" . . . for applying read and refresh pulses; a vertical shift register 32 for generating the read pulse, an interlacing circuit IL; buffer MOS transistors 33, 33', 33" . . . arranged between the interlacing circuit IL and the horizontal lines 31, 31', 31" . . . ; a terminal 34 for applying pulses to the gates of the buffer MOS transistors 33, 33', 33" . . . ; buffer MOS transistors 35, 35', 35" for applying refresh pulses; a terminal 36 for applying the refresh pulses to the gates of the transistors 35, 35', 35" . . . ; a vertical shift register 52 for applying the refresh pulse; vertical lines 38, 38', 38" . . . and 51, 51', 51" . . . for reading out an accumulated voltage from the reference photosensor cell 30; a horizontal shift register 39 for generating pulses for selecting each vertical line; gate MOS transistors 40, 40', 40" . . . and 49, 49', 49" . . . for selectively energizing/deenergizing corresponding vertical lines; MOS transistors 42 and 53 for respectively refreshing the charges accumulated on the output lines 41 and 59 after the output lines 41 and 59 are accessed to read out the accumulated voltage to a sense amplifier; terminals 43 and 54 for respectively applying the refresh pulses to the MOS transistors 42 and 53; transistors 44 and 55 such as bipolar transistors, MOSFETs, or J-FETs for amplifying the output signal; terminals 46 and 57 for respectively connecting load resistors 45 and 56 and the transistors 44 and 55 to a power source; transistor output terminals 47 and 58; MOS transistors 48, 48', 48" . . . and 50, 50', 50" . . . for refreshing the charges stored in the vertical lines 51, 51', 51" . . . in the read mode; and a terminal 149 for applying pulses to the gates of the MOS transistors 48, 48', 48" . . . and 50, 50', 50" . . .

In the image pickup device 1 in the above embodiment, the controller comprises a the clock driver circuit 3 for supplying a drive pulse to the components 32, 34, 36, 39, 43, 149, 52, 54, and IL and the clock generator circuit 4 for supplying timing pulses to the clock driver circuit 3.

Figure 4:
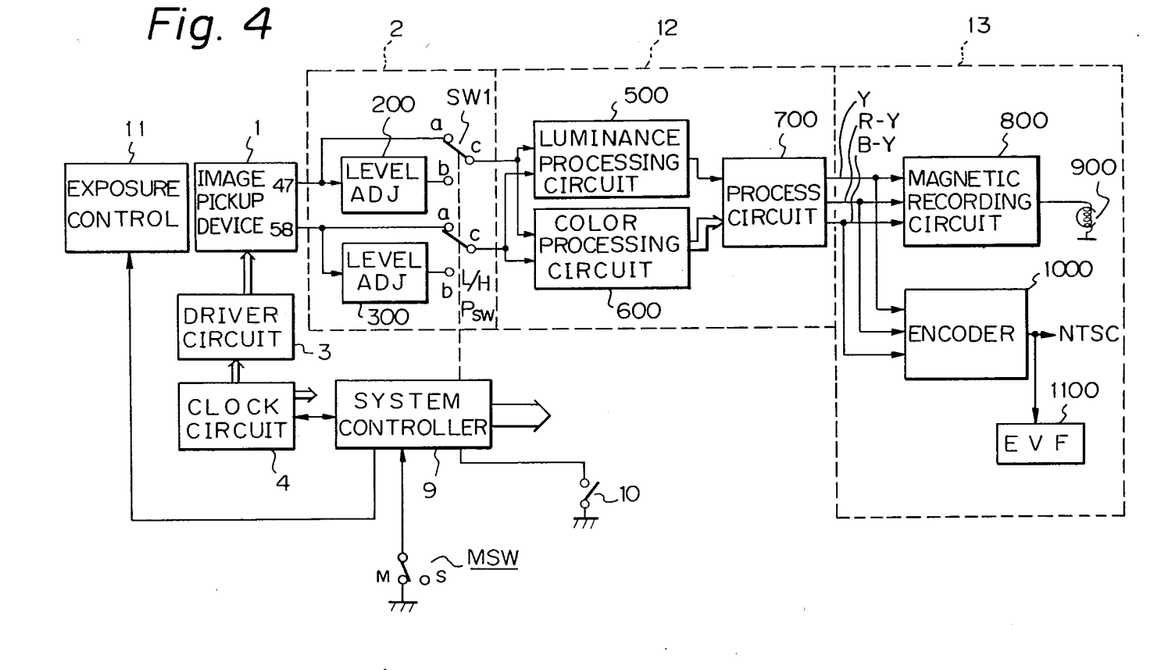
FIG. 4 is a block diagram of an image pickup system according to a second embodiment of the present invention.

FIG. 4 is a block diagram of a signal processing system according to a second embodiment of the present invention.

The same reference numerals used in FIG. 1 denote the same parts in FIG. 4. Level adjusters 200 and 300 are connected to the outputs of an image pickup device 1 to adjust signal gains of even-numbered fields in the nondestructive read mode. Switches SW1 are selectively connected to the inputs (i.e., contacts a) or outputs (i.e., contacts b) of the level adjusters 200 and 300, respectively. More specifically, the switches SW1 are set in the contact a positions for the odd-numbered fields and in the contact b positions for the even-numbered fields. A luminance processing circuit 500 is connected to the fixed contact c of both switches SW1 to generate a luminance signal. Also, a color processing circuit 600, is connected to the fixed contact c of both switches SW1 to generate color signals. The outputs of the luminance and color processing circuits 500 and 600 are connected to a process circuit 700. The process circuit 700 is designed to perform γ-correction and AGC white balancing on the basis of the luminance and color signals to produce a luminance signal Y and color difference signals R-Y and B-Y.

The outputs R-Y and B-Y of the process circuit 700 are connected to a magnetic recording circuit 800 and an encoder 1000. The magnetic recording circuit 800 includes a color difference line sequential signal generator for converting the color difference simultaneous signals of the color difference signals R-Y and B-Y into line sequential signals, an FM modulator for FM-modulating the luminance and color difference line sequential signals, and a recording amplifier. A recording head 900 is connected to the output of the magnetic recording circuit 800 and is designed to record an FM signal to a video floppy disk (not shown). The encoder 1000 generates an NTSC signal and supplies it to a VTR or the like.

The NTSC signal is also supplied to and monitored by an EVF (Electronic View Finder) 1100. A mode selection switch MSW is connected between the system controller and ground to select either the still image recording (still) mode or the movie recording (movie) mode. A trigger release switch 10 is connected between the system controller 9 and ground to instruct the system controller to begin photographing and recording.

Figure 5:
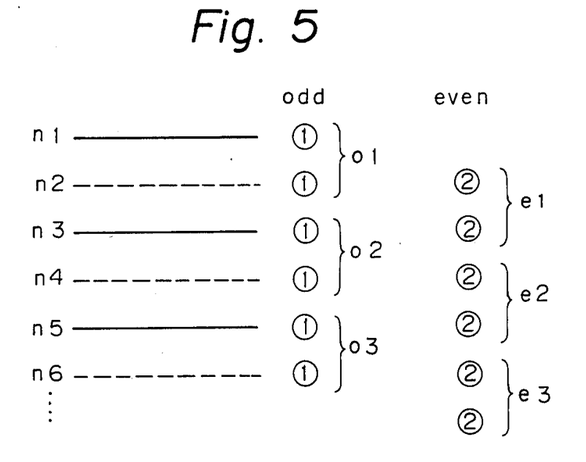
FIG. 5 is a chart for explaining driving of the image pickup device shown in FIG. 4.

FIG. 5 is a chart for explaining driving of the image pickup apparatus under the control of the system controller. Column data n1, n2 . . . are derived from the corresponding sensor cell columns. In an odd-numbered field, column data n1 and n2 constitute data of the o1 line and column data n3 and n4 constitute data of the o2 line. In the even-numbered field, combinations of the column data are changed That is, column data n2 and n3 constitute data of the e1 line and column data n4 and n5 constitute data of the e2 line.

The two horizontal line data as combinations each consisting of two lines shown in FIG. 5 are simultaneously read out in units of fields by the interlacing circuit IL (FIG. 3). The readout data respectively appear at the output terminals 47 and 58. In this embodiment, the image pickup system is controlled in the nondestructive read mode. Column data is not refreshed until the read operation for the even-numbered field is completed. Therefore, the identical data are read out a first time in the odd-numbered field and then a second time in the even-numbered field.

Figure 6:
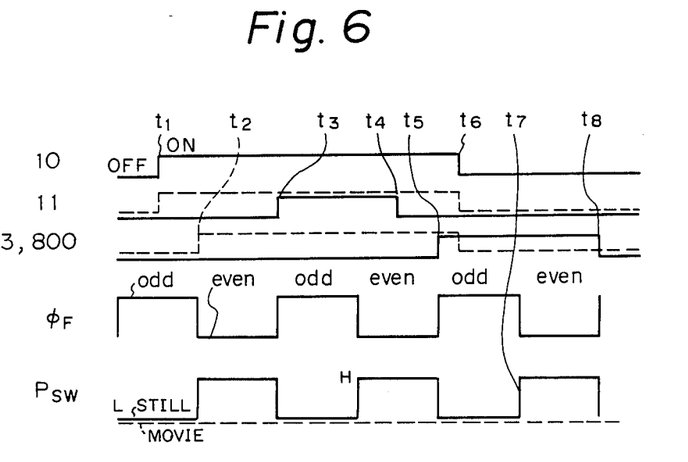
FIG. 6 is a timing chart for explaining operations in the movie and still modes.

The operation of the apparatus, shown in FIG. 4, in the still mode (indicated by the dotted lines) will be described first with reference to FIGS. 4 and 6. After the mode selection switch MSW is set in the still mode position, the release switch 10 is turned on (time t1). After a short period of time, a shutter or the like in the exposure control 11 is operated to perform an exposure for a predetermine time period t3 to t4. Thereafter, in the shutter closed state, various read control operations, shown in FIG. 5, are performed for a 2-field period (time t5 to time t8). While the shutter is closed, in the odd-numbered field, contacts a and c of the switches SW1 are connected under the control of the system controller 9 since PSW is kept at a low level for the time period t5 to t4. Therefore, the signals read out from the output terminals 47 and 58 (FIG. 4) of the image pickup device 1 are not input to the level adjusters 200 and 300 (FIG. 4) and are recorded on the track of the video floppy disk through the luminance processing circuit 500, the color processing circuit 600, the magnetic recording circuit 800, and the magnetic recording head 900 (FIG. 4). Upon completion of the above recording, the magnetic recording head 900 is fed to the (n+1)th track in order to record the even-numbered field signal.

In the even-numbered field, the image pickup device 1 is read-accessed in the nondestructive mode. The level of the output signal from the image pickup device 1 is reduced by several %. For this reason, the % loss of the output signal is compensated by the gain level adjusters 200 and 300. As indicated by the solid lines in FIG. 6, contacts b and c of the switches SW1 are connected to each other since the control signal PSW from the system controller 9 is set at high level for a time period t7 to t8. Therefore, the even-numbered field signals having substantially the same level as the odd-numbered field signals are supplied to the luminance and color processing circuits 500 and 600. The processed signals are then recorded on the (n+1)th track.

The magnetic recording head 900 is then fed to the (n+2)th track. In this state, one-frame recording has been completed. Therefore, the magnetic recording head 900 waits for the next photographing cycle when the release switch 10 is depressed again.

As described above, the signal levels in the odd- and even-numbered fields are set to be identical according to the number of read cycles, and thus a high-quality image free from flickering can be obtained.

The operation of the above system in the movie mode (indicated by the dotted lines) will be described with reference to FIG. 6. Switch 10 and pulse φF are the same as those in the still mode.

In the movie mode, the shutter in the exposure control 11 is kept open for a time period t1 to t6 since the release switch 10 is kept on for this period. Row refreshing is performed upon read access of the corresponding row so as to set the nondestructive read mode. In this case, the system controller 9 outputs the pulse PSW of low level to connect the contacts a and b of the switches SW1. The clock driver 3 and the magnetic recording circuit 800 are operated for a time period t2 to t6.

Figure 7:
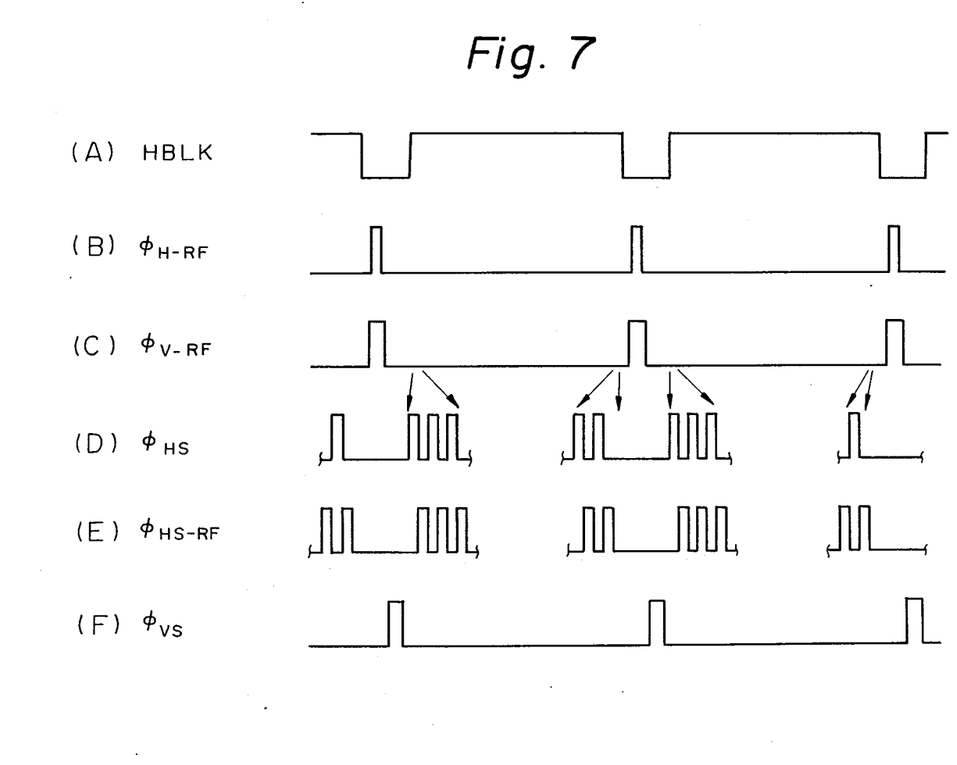
FIG. 7 is a timing chart for explaining the operation for driving the image pickup device shown in FIG. 3.

FIG. 7 is a timing chart of control pulses supplied from the clock driver circuit 3 to the image pickup device 1 shown in FIG. 4.

A horizontal blanking pulse HBLK (A) is used as a reference pulse for explaining other pulses. Refresh pulses φH-RF (B) and φV-RF are respectively supplied to the shift register 52 and the terminal 149 within the horizontal blanking period. The charges accumulated in the bases of the sensor cells and the vertical lines are refreshed (grounded) through the transistors 48, 48', 48" ... and 50, 50', 50" ...

A shift pulse $\phi$HS (D) is used for a horizontal shift register 39 and a shift pulse $\phi$VS (F) is used for a vertical shift register 32. A bit refresh pulse $\phi$HS-RF (E) is supplied to the terminals 43 and 54.

The pulses that are associated with mode selections in the destructive or nondestructive mode are refresh pulses (B) and (C). In other words, when the refresh pulses are disabled, the nondestructive read mode is set.

The system controller 9 controls the clock generator circuit 4 and the driver circuit 3 to arbitrarily select movie or still image recording. In the destructive read mode, the pulses $\phi$H-RF and $\phi$V-RF are enabled to refresh the column data upon readout operation in units of horizontal blanking periods, as shown in FIG. 7. However, in the nondestructive mode, the pulses $\phi$H-RF and $\phi$V-RF are disabled to read out the same row signals in the odd- and even-numbered fields, i.e., two consecutive fields.

A third embodiment of the present invention will be described with reference to FIGS. 8 and 9.

Figure 8:
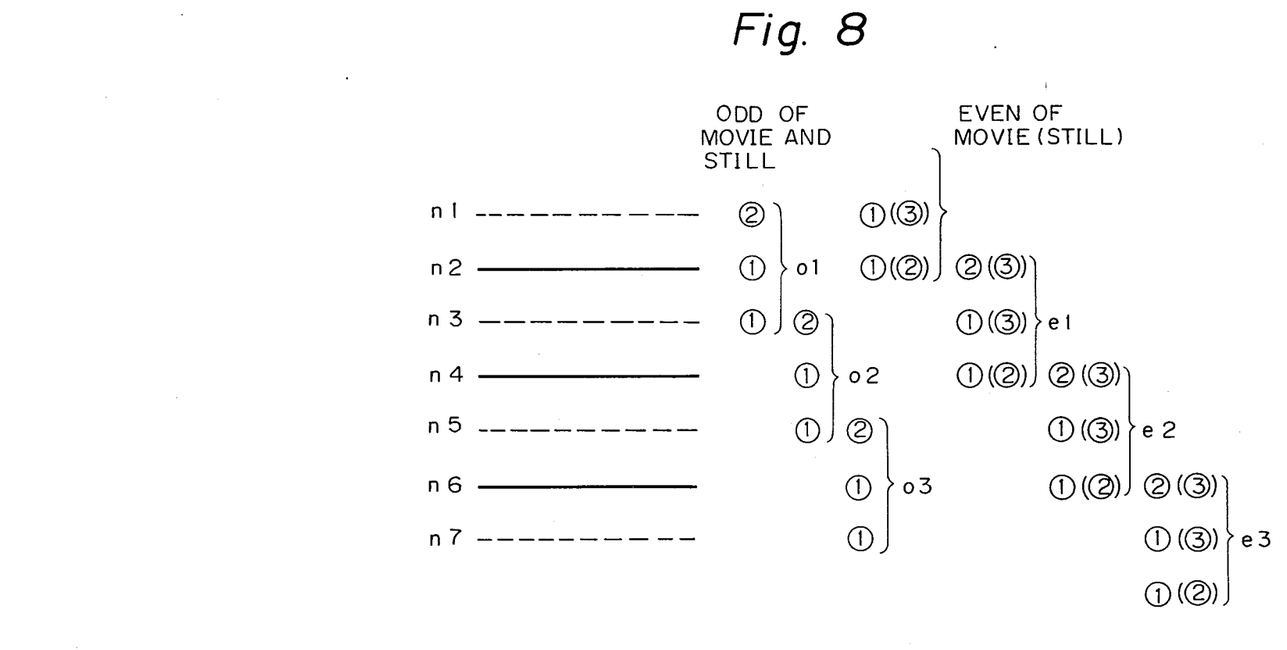
FIG. 8 is a chart for explaining operation of an image pickup system according to a third embodiment of the present invention.

FIG. 8 shows an image pickup system wherein three row outputs from an image pickup device are simultaneously read out. The arrangement of the image pickup device 1 in FIG. 8 can be easily modified from the two-line read arrangement of FIG. 3, and a detailed description thereof will be omitted. Column data n1, n2, and n3 constitute data of the o1 line in the odd-numbered field, and column data n3, n4, and n5 constitute data of the o2 line in the even-numbered field. In this case, data of the odd-numbered field is nondestructively read out in the movie mode.

The combinations of column data are changed in the even-numbered field. More specifically, column data n2, n3, and n4 constitute data of the e1 line, and column data n4, n5, and n6 constitute data of the e2 line.

In this case, even-numbered row data is nondestructively read out in the movie mode. It should be noted that all row data are nondestructively read out in the still mode.

In the odd-numbered field in the movie and still modes, the level of the output of only the uppermost line (i.e., odd-numbered row data) of the three row data (FIG. 8) constituting the o1, o2, and o3 lines is lowered.

In the even-numbered field in the movie mode, the level of the output of only the uppermost line (i.e., the even-numbered row data) of the three row data (FIG. 8) constituting the e1, e2, and e3 lines is degraded in the same manner as described above.

In the even-numbered field in the still mode, the levels of the outputs of upper two of the three row data constituting the e1, e2, and e3 lines are lowered since these upper two row data are read out three times. The lowest row data is read out twice so that the decrease in level of the output is relatively small.

Figure 9:
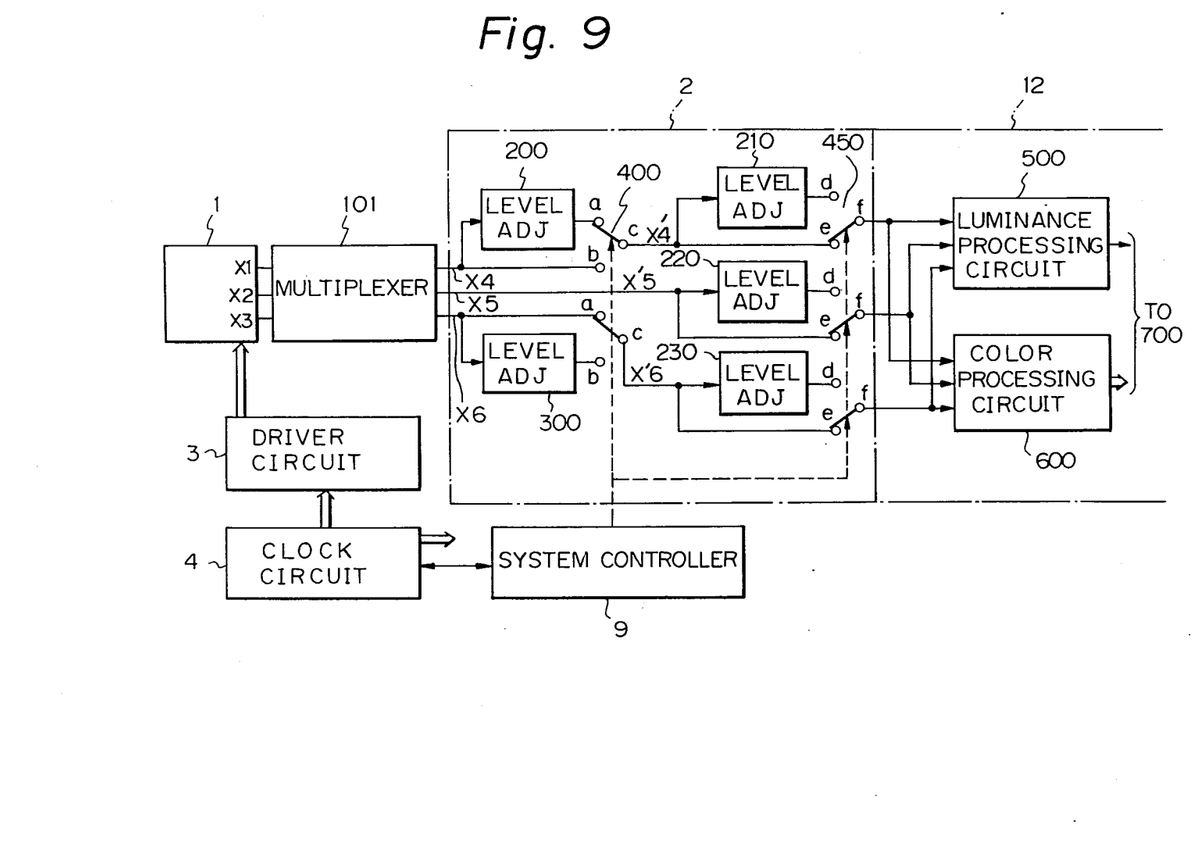
FIG. 9 is a block diagram of the image pickup system according to the third embodiment of the present invention.

FIG. 9 is a block diagram of a signal processing system of the embodiment shown in FIG. 8. This signal processing system is arranged by adding the following processing circuit to the embodiment of FIG. 4.

The signal processing system in FIG. 9 additionally includes a multiplexer 101. The multiplexer 101 is operated as follows.

Output lines of row data n1, n2, n3 ... are connected such that row data n1, n4, n7 ... are connected to a first output terminal x1, row data n2, n5, n8 ... are connected to a second output terminal x2, and row data n3, n6, n9 ... are connected to a third output terminal x3.

In order to control the read operation of an image pickup device 1 so as to generate an output of the horizontal o1 line in the odd-numbered field, the multiplexer 101 connects the output terminals x1, x2, and x3 to the output terminals x4, x5, and x6, respectively. In order to generate the output of the o2 line, the output terminals x3, x1, and x2 are respectively connected to the output terminals x4, x5, and x6. In order to generate the output of the o3 line, the output terminals x2, x3, and x1 are respectively connected to the output terminals x4, x5, and x6. In this manner, the connections of the output terminals x1 to x3 and x4 to x6 are changed in units of horizontal lines.

In order to form e1 in the even-numbered field, the multiplexer 101 connects the output terminals x2, x3, and x1, respectively, to the output terminals x4, x5, and x6. In order to form e2, the multiplexer 101 connects the output terminals x1, x2, and x3, respectively, to the output terminals x4, x5, and x6. In order to form e3, the multiplexer 101 connects the output terminals x3, x1, and x2, respectively to the output terminals x4, x5, and x6.

In order to generate outputs of horizontal lines in the movie and still modes, the level of one of the outputs is different from those of the remaining outputs. The level different from those of the remaining outputs must be adjusted by the level adjusters 200 and 300. In the odd-numbered field in the movie mode, the output of the uppermost line of three outputs (FIG. 8), i.e., the output at the output terminal x4 (FIG. 9) is lowered. The level of the output at the terminal x4 is increased to match the output level at terminals x5 and x6.

In the still mode, the level of the output of only the lowest line, i.e., the output at terminal x6 is higher than the outputs appearing at terminals x4 and x5. The level of the output at terminal x6 is decreased by the level adjuster 300 to match outputs appearing at terminals x4 and x5.

For this purpose, the system controller 9 connects the contacts a and c in the movie mode and the contacts b and c in the still mode.

Level adjusters 210, 220, and 230 are designed to increase the levels of the even-numbered field signals in the still mode. More specifically, as shown in FIG. 8, the second and third read cycles are performed for the even-numbered field, and the levels of the signals are greatly lowered, thus causing typical flickering. Since the level of the output appearing at the output terminal x6 is matched by the level adjuster 300 with those of the outputs at the output terminals x4 and x5. In the still mode, the difference between the even- and odd-numbered fields, when outputted, is great. The flickering components are removed by the level adjusters 210, 220, and 230, thereby providing a high-quality image. Switches 450 are set such that contacts e and f are connected to each other for both the odd-numbered field in the still mode and the movie mode and contacts d and f thereof are connected to each other for the even-numbered fields in the still mode.

The flickering caused by the three-line output scheme can be solved. Vertical and horizontal resolutions of the three-line outputs can be improved, and pseudo color signals can be further reduced.

Figure 10:
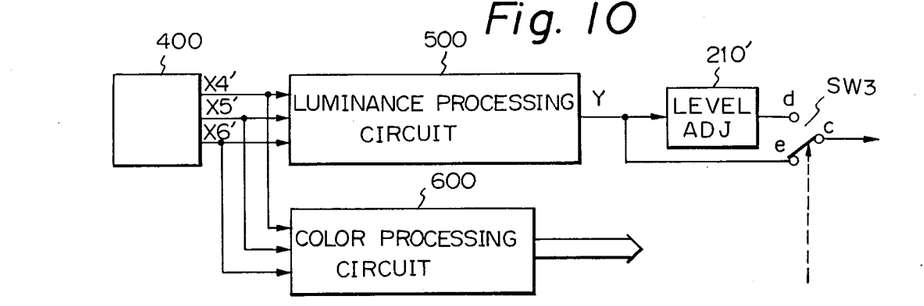
FIGS. 10 and 11 are block diagrams of image pickup systems according to fourth and fifth embodiments of the present invention.

FIG. 10 shows the fourth embodiment of the present invention. As shown there, an arrangement wherein the level adjusters 210, 220, and 230 are simplified. Flickering is mainly caused by the luminance signal Y. For this reason, after the three-line outputs appearing at output terminals x4' to x6' are combined to obtain a composite signal and the luminance signal Y is generated according to the dot sequential processing of the three-line outputs, the level of the signal is adjusted by a level adjuster 210'. A switch SW3 is set such that contacts c and e are connected to each other for the odd-numbered field in both the still mode and the movie mode and the contacts c and d are connected to each other for the even-numbered field in the still mode. Another method of generating the luminance signal is proposed such that one of a plurality of outputs is processed as an output corresponding to a green filter and that the processed signal serves as a low-frequency luminance signal In this case, the level adjuster is inserted in only the signal line for forming a low-frequency luminance signal.

Figure 11:
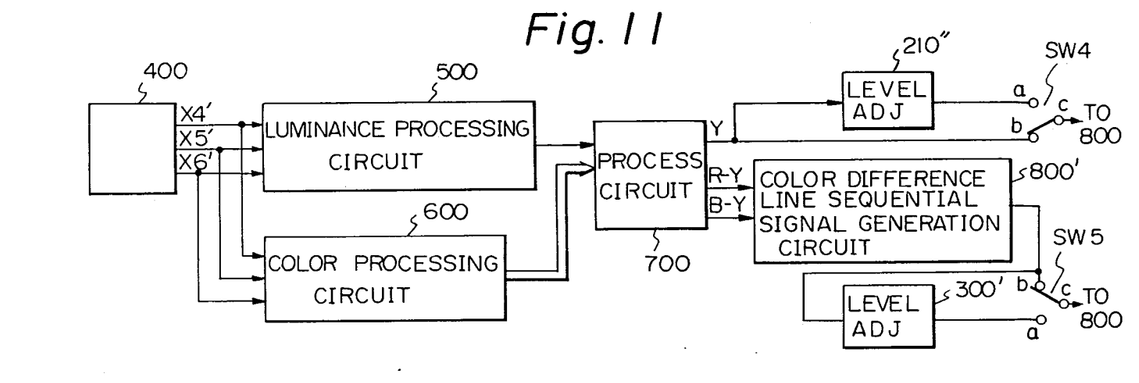

FIG. 11 shows a signal processing system wherein an output signal from the image pickup device is processed, and the level of the processed signal is adjusted according to a fifth embodiment of the present invention. The level of a luminance signal Y is adjusted by a level adjuster 210'' before the signal Y is input to a magnetic recording circuit 800.

In order to reduce the number of level adjusters, after the color difference signals are processed by a color difference line sequential signal generating circuit 800', the levels of the outputs from the generating circuit 800' are adjusted by a level adjuster 300'. Switches SW4 and SW5 are set such that contacts a and c are connected to each other for the even-numbered field in the still mode and contacts b and c are connected to each other for both the odd-numbered field in both the still mode and the movie mode. By the above processing, the luminance signal flickering components caused by nondestructive read access, deviations in color signals, deviations in white balance, and color flickering can be eliminated.

When the nondestructive read access is repeated a plurality of times, the signal level is adjusted according to the number of read cycles. Therefore, the flickering components of the luminance signal, the deviations in color components, deviations in white balance, and color flickering can be completely eliminated. Therefore, the advantageous feature of the nondestructive read access type image pickup system can be maximized.

The nondestructive and destructive read modes are selectively switched, and thus the movie or still image can be selected in accordance with the photographing purpose. The photographing conditions prior to still image recording can be checked without flickering.

According to the present invention, the gain of the output from the image pickup system is adjusted according to the number of read cycles when the output is repeatedly read out from the nondestructive read access type image pickup system a plurality of times. Therefore, flickering can be eliminated to greatly improve image quality.

What is claimed is:

1. An image pickup apparatus comprising:
   an image pickup device including a plurality of photoelectric transducer cells subjected to nondestructive read access for producing a photoelectrically converted information signal;
   driving means for nondestructively reading out the photoelectrically converted information signal from said image pickup device a plurality of times; and
   gain control means for changing a gain of the photoelectrically converted information signal in accordance with a number of repetitions of read out operations of said driving means.

2. An apparatus according to claim 1, wherein said driving means generates a plurality of field signals by nondestructively reading out the photoelectrically converted information signal from said image pickup device the plurality of times.

3. An apparatus according to claim 1, wherein said gain control means increases the gain of the photoelectrically converted information signal when the number of repetitions of read out operations of said driving means is increased.

4. An apparatus according to claim 1, wherein said gain control means controls a gain of the photoelectrically converted information signal of a next read out operation on the basis of the photoelectrically converted information signal of a given read out operation.

5. An apparatus according to claim 1, further including light-shielding means for shielding said image pickup device while the photoelectrically converted information signal is read out by said driving means from said image pickup device.

6. An apparatus according to claim 1, wherein said driving means has a nondestructive read mode for nondestructively reading out the photoelectrically converted information signal from said image pickup device and a destructive read mode for destructively reading out the photoelectrically converted information signal therefrom.

7. An apparatus according to claim 1, wherein said driving means simultaneously reads out signals of a plurality of predetermined rows of said image pickup device and sequentially and partially changes combinations of the plurality of predetermined rows.

8. An apparatus according to claim 7, wherein said gain control means changes gains of the photoelectrically converted information signals for rows subjected to a plurality of read out operations and rows subjected to a single read out operation when the signals of the plurality of predetermined rows are simultaneously read out.

9. An image pickup apparatus including:
   (a) image pickup means subjected to nondestructive read access;
   (b) detecting means for detecting a level of a predetermined image signal in said image pickup means;
   (c) control signal generating means for generating a control signal for controlling an output gain of the image signal on the basis of the level of the predetermined image signal, which is detected by said detecting means; and
   (d) processing means for reading out the predetermined image signal from said image pickup means again after the control signal is generated and for processing the predetermined signal read out again from said image pickup device on the basis of a gain represented by the control signal.

10. An apparatus according to claim 9, further comprising means for shielding said image pickup means while said detecting means detects the level of the predetermined image signal.

11. An apparatus according to claim 9, further comprising recording means for recording a signal processed by said processing means.

* * * * *

UNITED STATES PATENT AND TRADEMARK OFFICE
CERTIFICATE OF CORRECTION

PATENT NO. : 4,779,137

DATED : October 18, 1988

INVENTOR(S) : AKIHIKO TOJO, ET AL.

Page 1 of 2

It is certified that error appears in the above-identified patent and that said Letters Patent is hereby corrected as shown below:

COLUMN 2

Line 14, "phtoelectric" should read --photoelectric--.

COLUMN 6

Line 67, "a the clock" should read --a clock--.

COLUMN 7

Line 20, "600, is" should read --600 is--.

COLUMN 8

Line 10, "predetermine" should read --predetermined--.
    Line 17, "t4." should read --t7.--.

UNITED STATES PATENT AND TRADEMARK OFFICE
CERTIFICATE OF CORRECTION

PATENT NO. : 4,779,137
DATED : October 18, 1988
INVENTOR(S) : AKIHIKO TOJO, ET AL.

Page 2 of 2

It is certified that error appears in the above-identified patent and that said Letters Patent is hereby corrected as shown below:

COLUMN 11

Line 16, "signal In" should read --signal. In--.

Signed and Sealed this

Sixth Day of June, 1989

Attest:

DONALD J. QUIGG

Attesting Officer

Commissioner of Patents and Trademarks